Oct. 7, 1969  C. K. HULEN  3,470,619
APPARATUS FOR ARTICLE REGISTRATION
Filed May 16, 1966  2 Sheets-Sheet 1
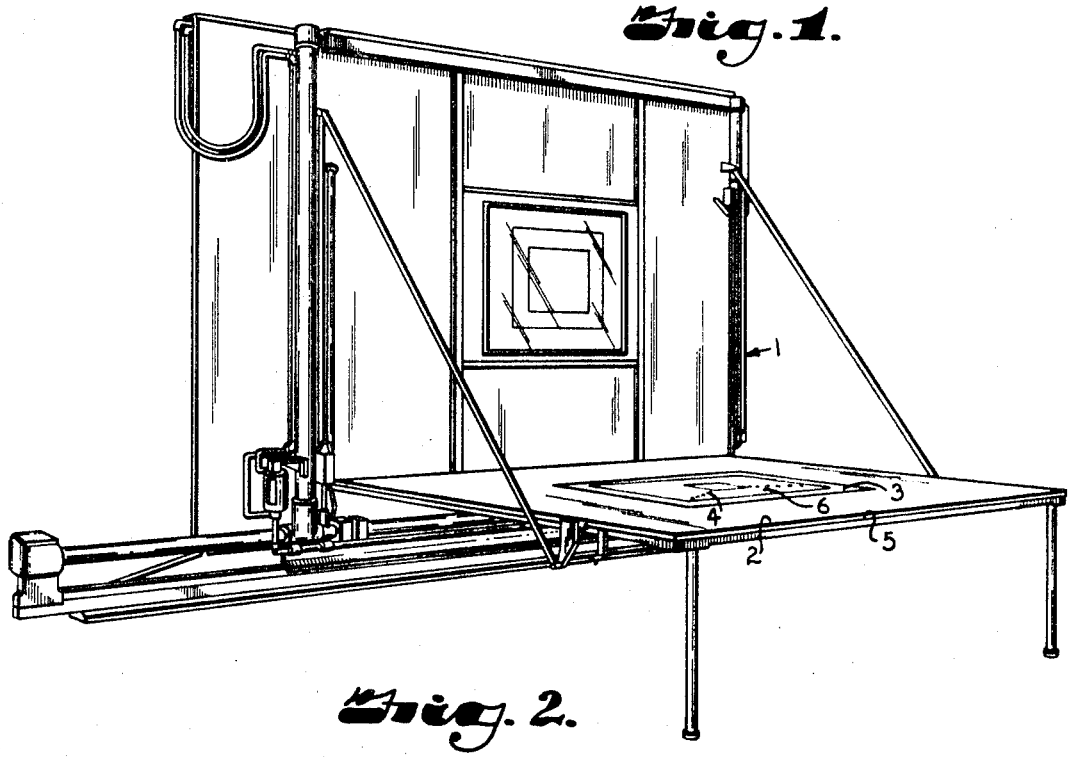
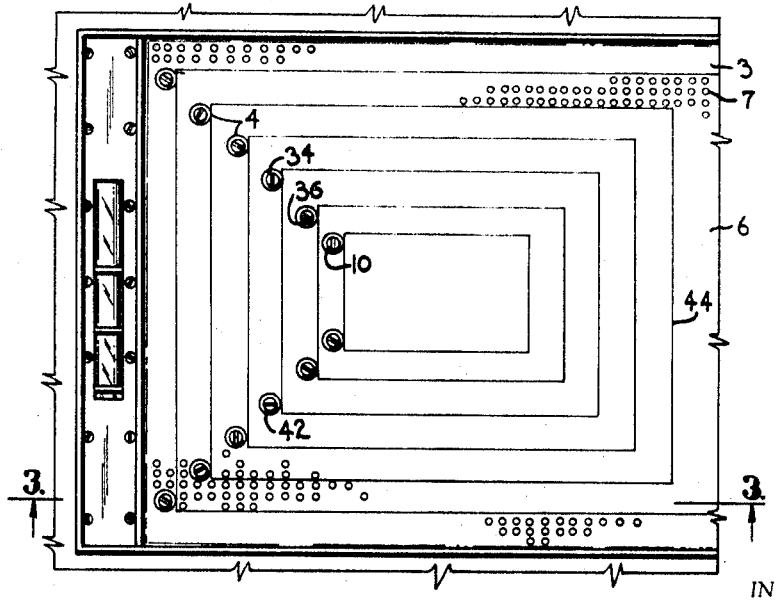
INVENTOR.
CLAUDE K. HULEN
BY
ATTORNEYS Oct. 7, 1969  C. K. HULEN  3,470,619
APPARATUS FOR ARTICLE REGISTRATION
Filed May 16, 1966  2 Sheets-Sheet 2

INVENTOR.
CLAUDE K. HULEN
BY
Fishburn and Gold
ATTORNEYS

United States Patent Office 3,470,619
Patented Oct. 7, 1969

3,470,619
APPARATUS FOR ARTICLE REGISTRATION
Claude K. Hulen, Kansas City, Mo., assignor to American Photocopy Equipment Company, Evanston, Ill., a corporation of Illinois
Filed May 16, 1966, Ser. No. 550,185
Int. Cl. B41b 15/34, 1/00
U.S. Cl. 33—184.5                                     4 Claims

ABSTRACT OF THE DISCLOSURE

An apparatus for accurately positioning and registering articles for reproduction in which a mounting member such as a camera back for receiving articles to be reproduced has a plurality of registering pin assemblies mounted therein whereby the pins are movable from a retracted position to a position extending out from the positioning surface. The pin assemblies include housings removably mounted on the mounting member and having a bore closed at one end and opening at the other end at the positioning surface. The registering pins are slidably mounted in the bores and engage a spring which urges the pins outwardly of the bore. The housings have bayonet slots which cooperate with abutment members on the pins for limiting the outward movement thereof at each of the retracted position and extended position. The pins have chamfered ends to facilitate positioning sheet material thereon and also a tool slot at exposed end for applying pressure and rotative force to move the pins to a retracted position.

---

This invention relates to the alignment and registration of various articles and more particularly, to a method and apparatus for the accurate positioning or registration of one article to another.

Heretofore, considerable difficulty has been encountered in providing proper alignment of one article to another in such arts as photocomposing where, for instance, it is necessary to accurately and consistently position a series of plates relative to a negative to obtain an image on each of said plates in proper registration with the images on the other plates for such operations as multicolor printing. The prior art devices usually employ various systems of registration which are either wholly or partially dependent upon the accuracy and consistency of the human eye in obtaining the proper positioning of the article. The utilization of such systems, even with the best of operators, results in some distortion in the produced images of the finished product, sometimes causing a loss in time and material to remake plates and repeat the printing operation.

The principal objects of this invention are: to alleviate the aforementioned difficulties in the art by providing a new and novel method and apparatus for positioning, alignment or registration of one article to another employing a wholly mechanical operation which does not rely upon the human eye in obtaining the proper alignment or registration; to provide such a method and apparatus wherein a series of articles may be located in the same position and orientation on a positioning surface such that each of the individual articles of said series may be aligned, positioned or registered in the same manner to another article or object; to provide such a method and apparatus wherein a series of plates may be positioned, aligned or registered within a camera reproduction means in the desired position and orientation in such a manner that other plates may be positioned and oriented in exactly the same manner as desired so as to produce uniformity in the reproduced images; to provide such a method and apparatus utilizing a registering or aligning means such as a pin or other protruding member which intersects the plane of an aligning or positioning surface on which an article such as a plate is supported, said article being positioned by passing said pins through a plurality of apertures accurately locateed in said articles, said pins being movable out of the plane of the positioning surface to avoid the conflict of said pin with other parts or elements of a process, for instance, in camera or photocomposing means, to avoid conflict between a pin used to align a plate and a negative when said plate and negative are brought into close relation for adjustment and exposure; to provide such an apparatus including at least two registration means, each of said means including a pin member springingly mounted in a housing and reciprocally movable between at least two positions, said pins being disposed in intersecting relation to the plane of an alignment surface such as the plate mounting back of a camera or photocomposing means when said pins are in at least one of said positions; to provide an apparatus for the exact registration of an article, said apparatus including a member, said member defining a positioning surface and further defining at least two bores in communication with said positioning surface and extending generally transversely of said surface with registering means operatively associated with said positioning surface, said registering means including at least two register pins, each of said pins being operable to move through a bore in said surface defining member between first and second positions, said registering means including retaining means to releasably retain said pins at each of said positions and wherein at least one of said positions places said register pins in an intersecting relation to said positioning surface such that an article to be registered having at least a pair of accurately positioned apertures may be placed on said surface with each of said pins being received in each of said operatures of said article, said pins having a chamfered head portion for ease of positioning said apertures over said pins and a tool engaging means such as a slot for ease in rotating said pin for releasement from said retained positions; to provide such a method for utilization in mounting articles such as plates and negatives in a photographic reproduction means by accurately forming a pair of apertures in said plate or negative moving at least two of said register pins on said mounting member within said reproduction means to a position wherein said pins intersect the plane of said positioning surface and placing said article in said reproduction means by positioning said article on said mounting surface with each of said pins being received in an aperture in said article to accurately position and orient said article on said surface in such a manner that subsequent articles may be located in exactly the same position and orientation on said mounting surface; to provide such an apparatus which may be easily and inexpensively manufactured and installed on existing equipment without extensive modification of said equipment.

Other objects and advantages of this invention will become apparent from the following description taken in connection with the accompanying drawings wherein are set forth by way of illustration and example certain embodiments of this invention.

FIG. 1 is a perspective view of a photocomposing apparatus embodying the features of this invention.

FIG. 2 is an upper plan view of the plate mounting portion of the photocomposing apparatus illustrated in FIG. 1 with a plurality of register pins mounted in a desired pattern to the plate mounting surface of said member in such a way that plates may be accurately aligned and positioned upon said surface.

Figure 3:
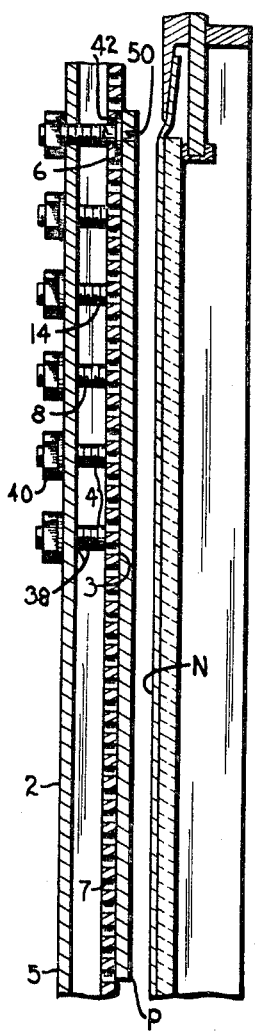
FIG. 3 is a vertical sectional view taken on line 3—3 of FIG. 2 showing the plate mounting member, a plate, negative and negative mounting member in their aligned position with the plate mounting member raised to its operative position.

Referring to the drawings in more detail:

The reference numeral 1 broadly designates a camera means or photocomposing apparatus embodying the features of this invention and illustrated herein as a photocomposing step and repeat machine. The photocomposing machine 1 is exemplary only as it illustrates an apparatus employed in a printing or reproducing operation wherein the alignment of various articles one to the other, for instance, the alignment of a series of plates to a particular negative is essential to the production of a finished product containing an image free from offsets or distortion. The apparatus 1 includes an alignment or positioning member 2 defining an alignment or positioning surface 3 and a register pin assembly 4 operatively associated with said positioning member to effect the accurate alignment or positioning of an article, such as a plate, negative or the like, upon the positioning surface 3.

In the illustrated embodiment, the positioning or mounting member 2 is illustrated as a camera back or backboard mechanism 5 of a camera or photocomposing apparatus 1, said backboard defining a plate alignment or positioning surface 6 extending in a generally flat plane, said surface receiving photosensitive plates for exposure with negatives mounted in the photocomposing apparatus 1. The backboard 5 contains means for mounting an article, such as a plate, to said backboard 5 in the desired position, said means being illustrated herein as a vacuum back wherein the positioning or alignment surface 6 of the backboard 5 contains a plurality of apertures 7, some of which are shown in FIG. 2 and through which a vacuum is drawn to retain the plate in the selected position upon surface 6. The vacuum retaining means is exemplary only as it is illustrative of a means for retaining the plate in a desired or selected position on the positioning surface 3 after alignment of the plate by utilization of the register pin assemblies 4.

Figure 4:
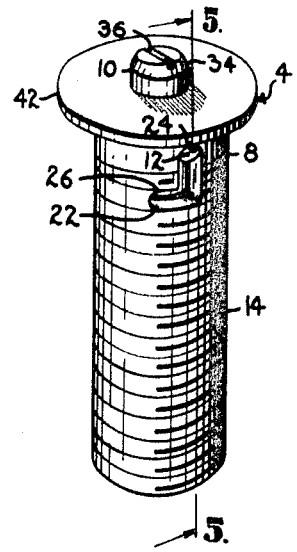
FIG. 4 is a perspective view of a register pin assembly including a register pin, pin housing and the means for releasably retaining said pin in at least two spaced positions.
Figure 5:
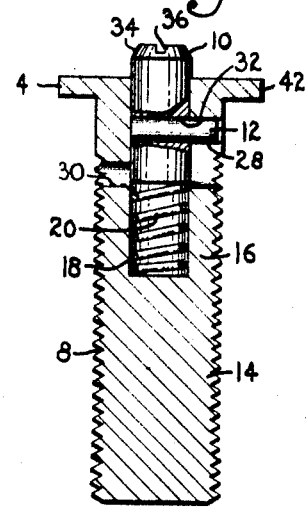
FIG. 5 is a sectional view taken on line 5—5 of FIG. of the register pin, pin housing and pin retaining means.

Referring to FIGS. 4 and 5, an embodiment is illustrated representing one form of a register pin assembly 4, the register pin assembly 4, as illustrated, having a housing or mounting frame 8, a register pin 10, and a pin retaining means 12. In the illustrated embodiment, the housing 8 is generally cylindrical having a body portion 14 with a cylindrical side wall 16, said side wall 16 defining a longitudinal bore 18 which extends partially through the body portion 14 of the housing 8, said bore 18 serving to receive the register pin 10 for sliding movement therein.

The register pin 10 is illustrated as being generally cylindrical conforming in shape to the bore 18. The register pin 10 is mounted outwardly of a spring means 20 which tends to force the register pin 10 outwardly of bore 18 and serves to cooperate with the retaining means 12 to releasably retain the register pin 10 in at least longitudinally spaced two positions.

The exterior wall 16 of the body portion 14 of housing 8 is illustrated as defining an L-shaped locking groove 22 which extends through said side wall 16 in communication with the bore 18 within the housing 8. The locking groove 22 defines two laterally offset longitudinarlly spaced abutment surfaces 24 and 26 which serve to retain the register pin 10 against the outward force of the coil spring 20 to releasably retain the register pin 10 in two longitudinally spaced positions relative to the bore 20.

The locking pin 10 is retained in these spaced positions by means of a lock bar or lock pin 28 which is operatively mounted to the register pin 10 in a suitable manner, for instance, by passing the lock bar 28 through an aperture 30 in the side wall 16 of the body portion 14 and into a through bore 32 in the register pin 10, the lock bar 28 being so dimensioned as to extend through the register pin 10 and outwardly into the locking groove 22 for abutting engagement with the abutment surfaces 24 and 26. The aperture 30 in the side wall 16 can then be sealed by suitable means to prevent the slippage of the lock bar 28 outwardly through the aperture 30 when the register pin assembly 4 is in use.

The register pin 10 may be locked in a first position or its lowermost or inner position within housing 8 by depressing the head portion 34 of the register pin by engaging a suitable tool such as a screw driver in a tool engaging groove 36 in the chamfered head portion 34 and forcing the pin 10 inwardly of housing 8 rotating the pin 10 to move the lock bar 28 laterally into abutting engagement with the abutment surface 26, thereby retaining the register pin 10 in its first or depressed position. The register pin 10 may then be moved to its upper, outer or second position by rotating the register pin 10, thereby moving the locking bar 28 laterally in the locking groove 22 to an underlying position of the abutment surface 24 and releasing the inward force on the register pin 10 to allow the coil spring 20 to force the register pin 10 outwardly of housing 8 and move the locking bar 28 into abutting engagement with the abutment surface 24, thereby releasably retaining the register pin 10 in its second or outward position.

Referring to FIG. 3, a plurality of register pin assemblies 4 are operatively mounted in selected positions on the back plate 5 of the photocomposing apparatus 1 in such a manner that the register pins 10 may be moved inwardly and outwardly relative to the positioning surface 6 between first and second positions wherein at least one of said positions places said register pin 10 in intersecting relation to the positioning surface 6 of the back plate or in intersecting relation to the plane of the mounting surface 6 of the back plate 5 such that a plate P having accurately positioned apertures may have at least two of said pins received in said apertures. The mounting member or back plate 5 contains a plurality of through bores 38 through which the body portion 14 of the register pin assembly 4 may be passed and threadingly engaged by a nut means 40 to clampingly engage the register pin assembly 4 in a selected position relative to the positioning surface 6. The body portion 14 of the housing 8 of the register pin assembly 4 contains an upper circumferentially extending flange portion 42 which, as illustrated in FIG. 3, is countersunk in the positioning surface 6 in such a manner as to clampingly engage the back plate 5 between the nut means 40 and the circumferential flange 42. The body portion 14 in the illustrated embodiment is threaded throughout most of its longitudinal length for receipt of a locking nut means such that the register pin assembly 4 may be mounted to back plates or camera backs of varying thickness in a manner similar to that shown in FIG. 3.

As illustrated in FIG. 2, the register pin assemblies 4 are mounted in a plurality of pairs to the back plate 5 in such a manner that each of said pairs may be utilized to engage a plate or the like of different sizes as shown by the lines 44 on the positioning surface 6 where the outermost pin assemblies 4 are employed to align and position a plate P on the positioning surface 6. The inner pairs of register pin assemblies 4 have their register pins 10 depressed so as not to conflict with the placement of the plate P on the alignment or positioning surface 6. In the illustrated embodiment, the first position or depressed position of the register pins 10 places said register pin 10 out of intersecting relation with the positioning surface 6. Once the plate P has been properly aligned on the positioning surface 6 and retained thereon by a suitable mounting means such as a vacuum, the pair of register pin assemblies employed to position or align the particular plate P may be moved to its depressed or first position in order to avoid any conflict between the plate P and the negative N when the plate P and negative N are moved into closely related positions and adjusted relative to one another to obtain the proper setting. Were the pins 10 not depressable, the pin heads 34 would scratch and otherwise damage the negatives N during alignment and exposure operations.

In operation, a plurality of plates such as a series of plates to be utilized in an offset color or printing operation are accurately punched by means of an apparatus such as a plate punch shown in Patent No. 3,196,725 which will accurately position and align a series of apertures 50 along an edge of the plate P. As each of said plates P is individually placed on the camera back or back plate 5, it is aligned in the desired position by first moving at least two of said register pins 10 on said back plate 5 to a position wherein said pins intersect the positioning surface 6 and then moving said plate P into the desired position by adjusting plate P such that each of the register pins 10 are received in an aperture 50 of plate P. The head portions 34 of pins 10 are chamfered to facilitate the placement of the pins in the apertures 50 of plate P. With the plate P in the proper aligned position on the positioning surface 6 as established by the alignment of the apertures 50 and the register pins 10, the plate P may be mounted to the positioning surface 6 with the register pins 10 still received within the apertures 50. The register pins 10 may then be moved inwardly to their first or depressed position out of intersecting relation with the positioning surface 6 to avoid any interference between the pins 10 and the negatives N.

What I claim and desire to secure by Letters Patent is:

1. An apparatus for the exact registration of an article relative to another article comprising:
   (a) a mounting member, said member defining a positioning surface disposed in a particular plane,
   (b) a plurality of registering pin assemblies each including an elongate housing having a longitudinal bore therein opening at one end,
   (c) means mounting the housings on said mounting member in selected spaced relation with the ends having the bore opening disposed substantially in the same plane as the positioning surface with the bore extending substantially perpendicular therefrom,
   (d) a register pin slidable in each bore and having one end normally protruding from said housing said pin being movable in said housing bore between first and second positions, said one end of each pin being chamfered and having a tool slot for application of force longitudinally and rotative to the pins to move same to a retracted position,
   (e) resilient means in the said housing engaging the respective pin to urge same to the protruding position,
   (f) cooperative means on said housing and said pin to releasably retain said pin in each of said protruding and retracted positions.

2. In a photographic reproduction means an article registration apparatus comprising:
   (a) a mounting member, said member defining a positioning surface disposed in a particular plane,
   (b) at least two registering pin assemblies operatively associated with said mounting member, said assemblies each including a housing having a bore therein,
   (c) means mounting the housing on said mounting member in selected spaced relation with the bores substantially perpendicular to the positioning surface,
   (d) a register pin slidable in each bore and protruding from said housing and movable through said housing between first and second positions, and cooperative means on said housing and said pin to releasably retain said pin in each of said positions, at least one of said positions placing said register pin in an intersecting relation to said plane of said positioning surface,
   (e) said cooperative means to retain the pin in at least two longitudinally spaced positions being comprised of a bayonet slot having a pair of longitudinally spaced laetrally offset abutment surfaces on said housing and a lock bar operatively connected to said register pins, said bar having a portion engageable with said abutment surfaces to hold said register pin in a releasably retained position, said pin having a head portion, said head portion having a tool engaging slot for engagement of a tool to rotate said pin to disengage said lock bar from said abutment surfaces.

3. In a photographic reproduction means, an article registration apparatus as recited in claim 2 wherein each of said housings defines a bore disposed transversely of said positioning surface and wherein said pin is received in said bore for movement between first and second positions, said bore having a lower portion with a spring means disposed in said portion and operatively connected to said register pin to apply an outwardly directed force tending to move said pin outwardly of said bore and wherein said lock bar in cooperation with said abutment surfaces retains said pin in said bore.

4. In a photographic reproduction means, an article registration apparatus comprising:
   (a) a mounting member, said member defining a positioning surface disposed in a particular plane,
   (b) at least two registering pin assemblies operatively associated with said mounting member, said assemblies each including a housing having a bore therein,
   (c) means mounting the housing on said mounting member in selected spaced relation with the bores substantially perpendicular to the positioning surface,
   (d) a large pin slidable in each bore and having one end normally protruding from said housing and movable in said housing bore between first and second positions,
   (e) said housing having a bayonet slot with a pair of longitudinally spaced laterally offset abutment surfaces,
   (f) a lock bar operatively connected to said register pin and having a portion engageable with said abutment surfaces to hold said register pin in a releasably retained position, at least one of said positions placing said register pin in an intersecting relation to said plane of said positioning surface.

References Cited

UNITED STATES PATENTS

| | | | |
|---|---|---|---|
| 3,176,601 | 4/1965 | Bradley | 33—184.5 |
| 2,871,572 | 2/1959 | Gutzmer | 33—184.5 |
| 2,236,197 | 3/1941 | Moore | 33—184.5 X |

FOREIGN PATENTS 1,131,148    1956    France.

LEONARD FORMAN, Primary Examiner

ROGER A. FIELDS, Assistant Examiner